Dec. 24, 1968    A. SPRUNG    3,417,508
PARKING SPACE BARRIER
Filed Jan. 17, 1967
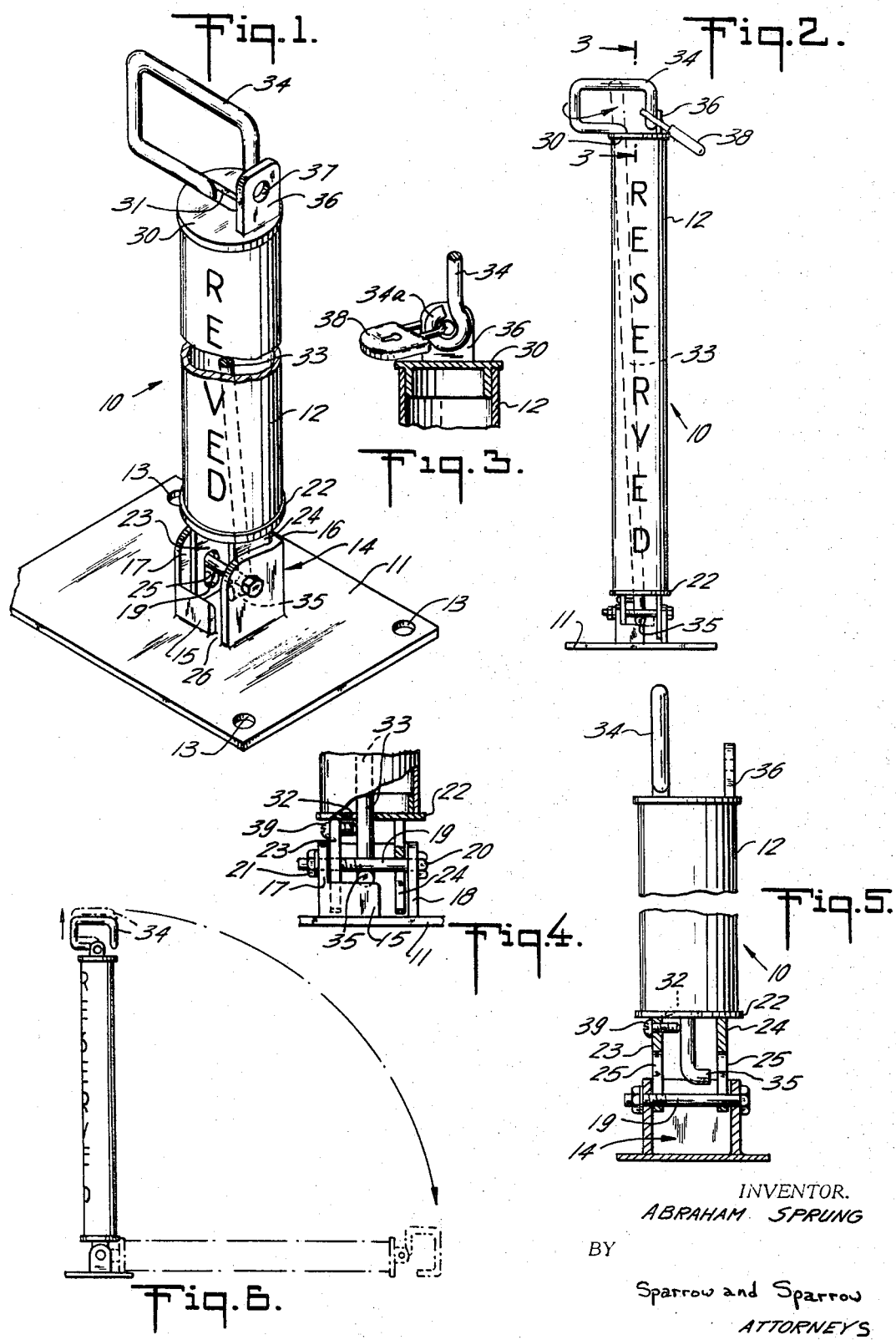
INVENTOR.
ABRAHAM SPRUNG
BY
Sparrow and Sparrow
ATTORNEYS United States Patent Office 3,417,508
Patented Dec. 24, 1968

3,417,508
PARKING SPACE BARRIER
Abraham Sprung, 2200 Center Road,
Fort Lee, N.J. 07024
Filed Jan. 17, 1967, Ser. No. 609,809
5 Claims. (Cl. 49—35)

ABSTRACT OF THE DISCLOSURE

A motor vehicle parking space barrier having a hollow stanchion and a fixed base upon which it is hingedly or swingably mounted upon a cross member or hinge pin for horizontal and vertical movements so that the stanchion can be swung from an inoperative position to a barricading position and fixedly locked in the latter position by an elongated shaft or rod extending through the stanchion, the shaft terminating in a latch or hook portion at one end projecting from one end of the stanchion for engagement with the cross or hinge member on the stationary base of the barrier and hand grip portion at its other end projecting from the other end of the stanchion. When the stanchion is placed in barricading position, the shaft is rotated by turning its hand grip portion thereby causing the hook portion of the shaft to firmly engage the cross member and hold the stanchion in barricading position. The hand grip portion may be locked in this position by locking means, such as a padlock or plunger type lock which fastens together the hand grip portion of the shaft to the stanchion.

BACKGROUND OF THE INVENTION

The field of art to which the invention pertains embraces motor vehicle parking space barriers that can be rigidly fixed and locked into position to restrict and deter a vehicle from entering a reserved parking space, particularly in such locations where there are no parking attendants, and also that can be swung out of its barricaded position to permit entrance and exit of the vehicle of the person authorized to use the parking space.

Heretofore a problem existed to provide a parking space barrier with simple and efficient means for maintaining and locking the stanchion in firm upright or barricading position, securing the stanchion in such position, and lowering the same with facility to permit entrance and exit of the vehicle. The present invention has provided an instrumentality which solves this problem.

SUMMARY

The present invention concerns itself with improvements over applicant's Patent 3,235,214 granted Feb. 15, 1966, in that, among other things, novel locking means are provided for rigidly maintaining and locking the stanchion in a barricading position, said means being accomplished by an elongated member or shaft extending through the stanchion and having a hand grip at one of its ends which projects above the stanchion and a hook or latch at the other of its ends which extends below the stanchion, the said elongated member being rotatable to hook-locking position with the stationary base by means of turning the hand grip and the provision of a lock at the top of the stanchion to lock the hand grip to the stanchion when the hand grip is thus turned.

It is an object of the present invention to provide an efficient, practical and inexpensive parking barrier which will prevent trespassers from entering a reserved parking space.

A further object of the present invention is to improve existing means for securely maintaining and locking the stanchion of a parking space barrier in its barricading position after being raised to its operative position.

BRIEF DESCRIPTION OF THE DRAWING

The above and other objects and advantages of the invention will hereinafter appear by reference to the accompanying drawing forming a part of this specification in which like characters of reference designate corresponding parts throughout the several views in which:

FIG. 1 is a perspective view of a parking space barrier according to the invention, showing the locking bar in locked position;

FIG. 2 is a front view thereof showing the hook or latch portion of the bar engaging the horizontal hinge pin, and in locked position;

FIG. 3 is a detail of the upper portion of the device seen in FIG. 1, showing the hand grip in alignment with the lug ready to receive the padlock;

FIG. 4 is a detail of the bottom section of the stanchion showing the hook or latch portion of the bar engaging the hinge pin;

FIG. 5 shows the device in unlocked position, partly in section; and

FIG. 6 shows the device in a vertical position in full lines and horizontal position in broken lines.

DESCRIPTION OF THE PREFERRED EMBODIMENT

Referring now more particularly to the drawing which discloses an example of carrying out the invention, there is shown a parking space barrier generally indicated by the reference character 10 comprising a base 11 to which is swingably mounted a hollow stanchion or housing 12 which may be cylindrical as seen in the drawing. Base 11 is provided with holes 13 preferably adjacent its corners for fixing the parking space barrier 11 to the ground, usually placed in the center of a parking space. Vertically mounted upon or connected to base 11 at the central portion thereof is a socket 14 which comprises front and rear upstanding flanges or walls 15 and 16, respectively, connected to spaced upstanding end or side flanges or walls 17 and 18, respectively. A transverse or cross pin or shaft 19 is mounted in end or side walls 17 and 18. Shaft 19 may be a bolt having a head 20 at one end and a nut 21 threadedly engaging the bolt at its other end. Stanchion 12 is provided with a cap 22 at its lower end from which depend a pair of spaced extending lugs or similar members 23 and 24, each of which has a vertical slot 25 through which passes hinge shaft 19. Thus, a stanchion 12 is swingably mounted on shaft 19 and may be raised or lowered within the limitations of slots 25. When stanchion 12 is lowered its lugs 23 and 24 are confined between front and rear walls 15 and 16 and stanchion 12 is thereby maintained in an upright position. That is, slots 25 will engage hinge shaft 19 so that the latter will be located in the upper part of slots 25 when stanchion 12 is in a vertical or upright position. At this time the bottom end of stanchion 12, that is, its lugs 23, 24 is held within socket or support 14 between front and rear walls 15 and 16. Both front and rear walls 15 and 16 project upwardly from the bottom of socket 14 or base 11. Wall 15 is lower, that is, less in height than wall 16. Wall 15 is required to be lower in order that stanchion 12 will not be obstructed when swung or lowered to the ground. To swing stanchion 12 from vertical to a substantially horizontal position, it must be first raised so that hinge pin or shaft 19 is now located in the lower ends of slots 25. Stanchion 12 then can be swung downward to the ground. To perform this movement stanchion 12 is lowered downward over wall 15 of socket or support 14. It is understood that socket 14 can be an integral part of base 11 or may be built up thereon, and that stanchion 12 may assume any desired shape. An opening 26 may be provided at wall 15 for drainage of water which otherwise may collect within socket 14.

Stanchion 12 is provided with an upper or top cap 30. Both upper and lower caps 30 and 22 are provided with aligned slots 31 and 32. A locking shaft or bar 33 extends through stanchion 12 and through slots 31 and 32, and has at its forward or upper end a hand grip portion 34 projecting above cap 30 and at its rearward or lower end a latch or hook portion 35 projecting below cap 22. Latch or hook 35 preferably comprises a substantially ninety degree bend in bar 33, forming a substantially right angled hook. Slots 31 and 32 permit the latch, hook or bent portion 35 of locking bar 33 to be inserted in stanchion 12 to reach hinge pin or shaft 19. Hook portion 35 is adapted to lockingly engage shaft 19 when stanchion 12 is in raised position and hand grip 34 turned ninety degrees in either direction. Projecting from cap 30 is an upstanding member or lug 36 having a hole 37.

FIG. 1 shows bar 33 in locked position at which time it will be noted upper ends of slots 25 rest on bolt or shaft 19 and hook portion or latch 35 engages shaft 19. Hand grip 34 has an eye portion 34a. FIG. 2 shows hook portion 35 of locking bar 33 engaging the horizontal hinge bolt 19 in locked position. Eye portion 34a of hand grip 34 is now in register with hole 37 in lug 36 ready to receive a suitable locking means such as padlock 38 having its link portion received through the ready to receive a suitable locking means such as padlock 38 having its link portion received through the registering holes in lug 36 and eye 34a, by which shaft or bar 33 is locked to lug 36 of stanchion 12. The locking shaft or bar 33 connecting hand grip 12 with integral hook portion 35 is seen in broken lines in FIG. 2. FIG. 3 which is a detail of the upper portion of the device seen in FIG. 1, shows hand grip 34 in alignment with lug 36 ready to receive the padlock. FIG. 4 shows the barrier in latched position.

FIG. 5 shows the stanchion 12 in unlocked position with relation to hinge shaft 19, obtained by turning hand grip 34 ninety degrees either way from its position seen in FIG. 1. A set screw 39 or other similar stop means projects inwardly from lug 23, and below slot 32 of stanchion cap 22 to prevent the hook portion of bar 33 from being accidentally withdrawn from the stanchion. This also affords a simple means to withdraw the bar 33 from the stanchion for replacement or repair.

It is understood that the locking arrangement is effective without the padlock 38, but in that case the device would not be locked against tampering. With the use of padlock 38, the device according to the invention provides a double locking arrangement to prevent trespassers from unlocking the barrier and thus prevent them from unauthorizedly using the parking space. The padlock and hook or latch provide the double lock protection.

It is further understood that the device of the invention may be arranged or secured so that the stanchion may be disposed in a horizontal barricading position and swung to an upright or vertical inoperative position for entrance to and exit from the parking space.

Although the present invention has been described in detail by way of illustration and example, it is understood that further changes and modifications may be made within the scope of the invention and the appended claims.

What is claimed is:

1. A parking space barrier comprising a socket, a stanchion having a lower end an an upper end, said lower end being receivable in said socket, means hingedly connecting said stanchion to said socket at said lower end permitting the swinging of said stanchion to substantially vertical and horizontal positions selectively, said hingedly connecting means comprising slotted portions of said stanchion at its said lower end and a transverse member fixed to said socket and passing through the slots of said slotted portions of said stanchion, and a horizontally rotatable and vertically movable shaft passing through said stanchion and projecting from said lower and upper ends of said stanchion, said shaft having a substantially hook-shaped latch portion where it projects from said lower end of said stanchion, said latch portion of said shaft being adapted to engage said transverse member in latched position when said shaft is rotated in one direction and adapted to be disengaged from said transverse member to unlocked position when said shaft is rotated in the opposite direction.

2. A parking barrier according to claim 1, said shaft having a hand grip portion for rotating said shaft where it projects from the upper end of said stanchion for rotating said shaft for engaging and disengaging said latch portion from said transverse member, means for locking said hand grip portion of said shaft to said stanchion when said latch portion is in said latched position.

3. A parking space barrier according to claim 2, said shaft being vertically movable in relation to said stanchion when said latch portion of said shaft is in unlatched position for consecutively raising and swinging said stanchion to an unbarricading position.

4. A parking space barrier according to claim 1, and, said stanchion being hollow and being provided with closures at its said upper and lower ends, said closures having slots to accommodate said latch portion of said shaft for removal and insertion of said shaft in relation to said stanchion.

5. A parking space barrier according to claim 4, and blocking means at said lower end of said stanchion for preventing disengagement of said shaft from said stanchion.

References Cited

UNITED STATES PATENTS 3,061,960  11/1962  Dull _____ 49—35

FOREIGN PATENTS 967,322  8/1964  Great Britain.

DAVID J. WILLIAMOWSKY, *Primary Examiner.*

DENNIS L. TAYLOR, *Assistant Examiner.*

U.S. Cl. X.R.

49—131